L. H. WHITNEY.
Vine Trellis.

No. 68,475.  Patented Sept. 3, 1867.

Witnesses:

Inventor:
Levi H. Whitney

United States Patent Office.

LEVI H. WHITNEY, OF VALLEJO, CALIFORNIA.

Letters Patent No. 68,475, dated September 3, 1867.

---

IMPROVEMENT IN VINE-TRELLIS.

---

The Schedule referred to in these Letters Patent and making part of the same.

---

TO ALL WHOM IT MAY CONCERN:

Be it known that I, LEVI H. WHITNEY, of Vallejo, in the county of Solano, and State of California, have invented a new and useful Improvement in Vine-Trellises; and I do hereby declare the following to be a full, clear, and exact description of the same, reference being had to the accompanying drawings, in which—

My invention relates to an improved manner of constructing a wire trellis, over which the vines are spread, and carried horizontally on equidistant wires, and in connecting these horizontal wires to each hill by means of vertical wires, which are grouped at their lower ends and anchored at each hill.

That others may understand the construction and operation of my invention I will particularly describe it.

Figure 1:
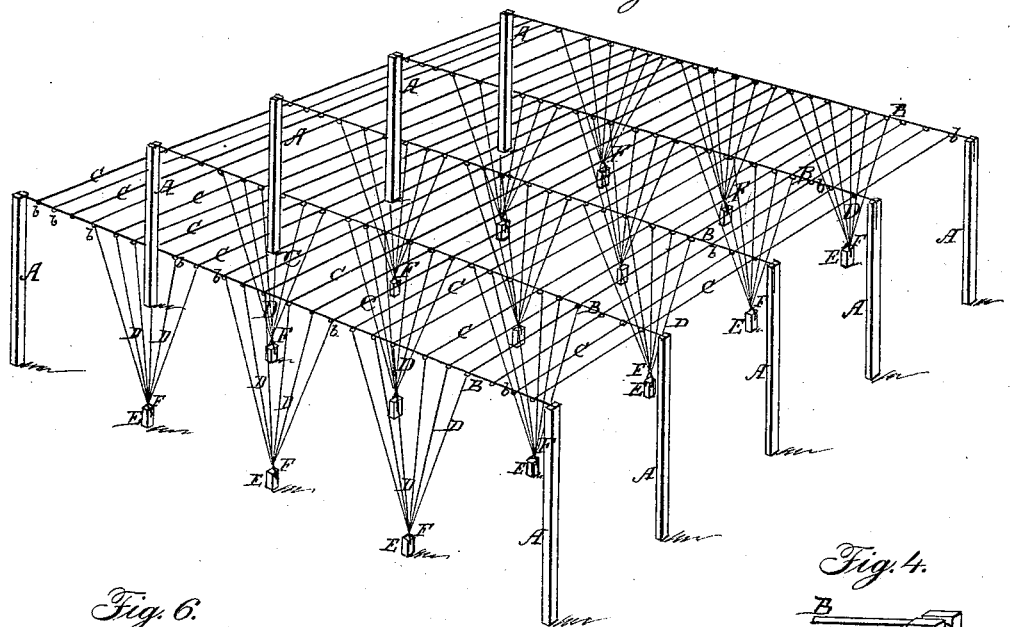
Figure 1 is a perspective view of my trellis.

In fig. 1 is a perspective view of a field, with my trellis in position. This trellis is particularly adapted to the cultivation of hops, and in the following description it will be so designated, though it is evident that other vines may be beneficially trained upon a similar trellis, and therefore I do not confine myself to its use in connection with the cultivation of hops.

At the end of each row of plants is set a stout post, the top of which stands, say, seven feet from the ground. Other posts of equal height are placed along each row at convenient intervals, say at every fourth hill. Over the tops of the posts A, along each row of plants, the bearing wires B B are stretched, and firmly secured at the ends of the rows by anchoring to stakes driven into the ground at some little distance from the ends of the rows, or by some other means. These bearing wires have to sustain the lateral wires C and the vertical wires D, and it is necessary that said lateral and vertical wires should be disposed equidistant from each other, and so retained without the necessity of any removable fastenings, which would materially increase the cost of the trellis. I therefore, before putting up the bearing wires B, form eyes or loops at certain equal intervals along its length, through which the lateral and vertical wires are to be placed when the trellis is completed. These loops are shown at $b$, and are formed by bending the wire around a pin, and this operation may be performed by machinery. The spaces intervening between the loops may vary, according to the ideas of the users, but I consider from fifteen to twenty inches to be good limits. When the wires B are set up, they should be arranged so as to bring the loops of the several wires accurately in line across the field.

Figure 6:
Figure 6 shows a perforated tag attached to the wire so as to dispense with loops.
Figure 4:
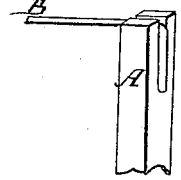
Figure 4 is the top of one of the supporting posts.
Figure 3:
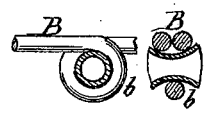
Figure 3 shows one loop, with a thimble inserted to prevent contraction of the loop.

It may be found necessary to insert thimbles or some equivalent device within the loop to prevent the contraction of the same when the full weight of the growing vines rests upon them, for it is evident that more strength of wire will be required to resist elongation by this contraction of the loops than would be required to sustain the load if the wire were plain. Fig. 3 exhibits a thimble inserted in the loop, and these may be inserted as the loop is formed by placing one upon the pin before the bending takes place. The same object may be attained by passing the wire through a brazing furnace, and brazing the two parts together at the points where they cross, or by securing tags G, of sheet metal, as in fig. 6.

Figure 2:
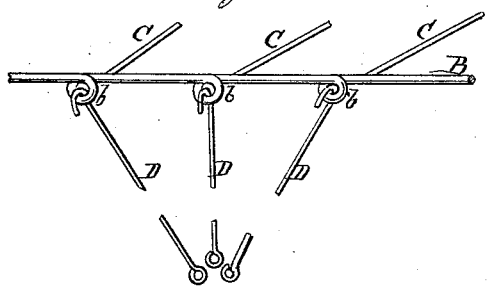
Figure 2 shows the loops of the main wires, and the attachments of the vertical and lateral trailing wires.
Figure 5:
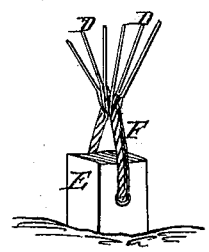
Figure 5 shows the mode of anchoring the vertical wires at each hill.

When the bearing wires B are in place, the vertical wires D are next attached. These wires are bent at one end so as to form a loop, and the other end so as to form a hook, as shown in fig. 2, and they must be of graduated lengths, so that their lower or looped ends may be grouped together at the hills, as shown in figs. 1 and 5. The hooks are inserted through the eyes $b$, and the several wires which are to be grouped at each hill are drawn together at the lower ends, and a piece of stout twine, F, passed through the loops. A small stake or post, E, has previously been driven into the ground close to the hill, and a small auger-hole may be made through the top of this post, through which the cord F may pass to anchor the group of vertical wires, or the cord may simply be tied around the post E. In anchoring the vertical wires, they should be drawn down with some force, so as to depress the bearing wires about as much as the weight of the vines would depress them, and the vertical wires will not then be rendered slack when the vines have attained their growth. After all of the vertical wires have been attached and anchored, the lateral wires C may be passed through all of the eyes $b$, in line from one side of the field to the other, and the ends may be kept from drawing out of the outer eyes by being turned down hookwise, as shown in fig. 2. When the lateral wires are all in place the trellis will be completed.

It will now be perceived that the vines from each hill may climb the vertical wires D, being spread sideways by so doing, so as to occupy the entire length of the row, and when they have reached the bearing wires they may extend horizontally along the lateral wires C to the full extent of their growth, and that they will there be disposed in equidistant lines, occupying the entire surface of the plantation, and spread apart as much as desired, so that each separate stalk may have its own supporting wire and receive the full benefit of the air and sunlight, of which a large portion of them are deprived when the vines of each hill are massed upon single poles or cords, and the yield of fruit will therefore be greatly increased.

In the cultivation of hops, poles have almost universally been employed, and their use, owing to the first cost and the continual expense of handling, &c., has rendered the crop an uncertain one, because a high price for the fruit must be commanded in order to be remunerative. With my trellis the first cost will be decreased and the yield of fruit increased, and the expense of caring for the crop, &c., will be materially reduced.

The horizontal wires being placed at a distance of six and one-half ($6\frac{1}{2}$) to eight (8) feet from the ground permits the free cultivation of the ground by horse power or otherwise, and when the fruit is ripe it may be gathered without cutting and taking the vines down, as is necessary when poles are used, the cutting of the green vines near the root causing a material waste by the back flow of sap. In gathering, a light cart may be drawn or driven between the rows, and the pickers may stand thereon, and the fruit, which will almost entirely be found pendent from the wires C, may be picked with ease, and free from leaves and other debris of the vines.

When the vines are withered and dry, they may be cleared from the trellis in the following manner: With stout and sharp shears they are clipped along the line of each bearing wire B, and the lateral wires being liberated at their ends, they may be drawn out of the eyes $b$, and of course the dead vines stripped off. These lateral wires may be withdrawn conveniently by winding upon small drums, mounted in a wagon and moved along the edge of the plantation, withdrawing several wires at one time. These wires should be kept upon the drums until the next season, when they are are to be replaced in the trellis. The cords F may next be cut, and the vines clinging to the wires D may then be stripped off, and the trellis will be entirely freed. The wires D may be removed and stored until the next season, or may be left in position, as most convenient.

The wires would be rendered more durable by being galvanized, and it would be a material advantage to employ steel wire throughout, as less weight would be required, and the wire, being tempered, would be less likely to kink. I, however, do not propose to claim the use of steel wire as an element of my invention in this patent.

If preferred, cords or twine may be used instead of the vertical wires D, but I do not consider that it would be economical to do so, as the cords would necessarily have to be renewed every year, and it would require more labor to put them in place.

Where the plantation is large, it may be found necessary to insert springs occasionally in the wires B, in order to compensate for expansion and contraction with changes of temperature. If, however, the loops $b$ are made by bending the wire and without brazing, each loop will constitute a spring, which will render unnecessary any others.

Having thus described my invention, what I claim as new, and desire to secure by Letters Patent of the United States, is—

1. The combination of the bearing wires B, lateral wires C, and vertical wires D, for the purpose of forming a trellis as described.

2. The thimbled loop $b$, (shown in fig. 3,) substantially as and for the purpose described.

3. The perforated tag G, (shown in fig. 6,) in combination with the trellis wires B, substantially as shown and described.

4. The vertical wires D D, equally spaced, and spread apart at their upper ends, and grouped together at their lower ends, so as to be secured to a single stake at the hill, substantially as shown and described.

LEVI H. WHITNEY.

Witnesses:
R. D. O. SMITH,
D. B. VENTRE.